United States Patent [19]
Kumagai

[11] Patent Number: 5,164,546
[45] Date of Patent: Nov. 17, 1992

[54] WIRE HARNESS PROTECTOR

[75] Inventor: Fumio Kumagai, Aichi, Japan

[73] Assignee: Yazaki Corporation, Tokyo, Japan

[21] Appl. No.: 567,505

[22] Filed: Aug. 15, 1990

[30] Foreign Application Priority Data

Aug. 30, 1989 [JP] Japan ................................ 1-100437
Feb. 26, 1990 [JP] Japan ................................ 2-17404

[51] Int. Cl.$^5$ .............................................. H01B 7/00
[52] U.S. Cl. .................................. 174/135; 24/115 M;
24/115 K; 174/72 A; 174/74 A; 403/211;
439/445; 439/459
[58] Field of Search ............... 174/72 A, 74 A, 135;
24/115 J, 115 K, 115 M; 403/209, 211;
439/445, 456, 459

[56] References Cited

U.S. PATENT DOCUMENTS 2,337,781 12/1943 Stoker ................................ 174/74 A
4,782,560 11/1988 Keller ............................ 24/115 M X

FOREIGN PATENT DOCUMENTS 2918705 11/1980 Fed. Rep. of Germany ...... 174/135

Primary Examiner—Morris H. Nimmo
Attorney, Agent, or Firm—Sughrue, Mion, Zinn Macpeak & Seas

[57] ABSTRACT

A wire harness protector prevents wire harness wear resulting from repeated flexing at a single point by holding the harness in a bent fashion. The harness fits between a retaining portion and a retaining cap. A fixing arm may be connected to the retaining portion to facilitate attachment of the harness to a vehicle.

5 Claims, 5 Drawing Sheets

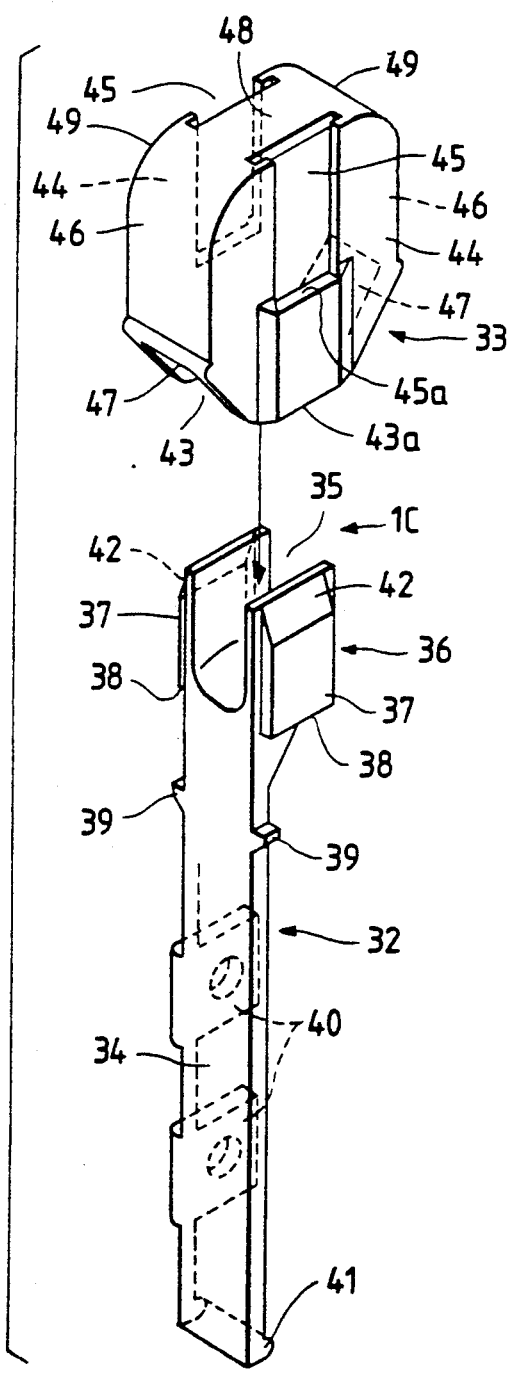
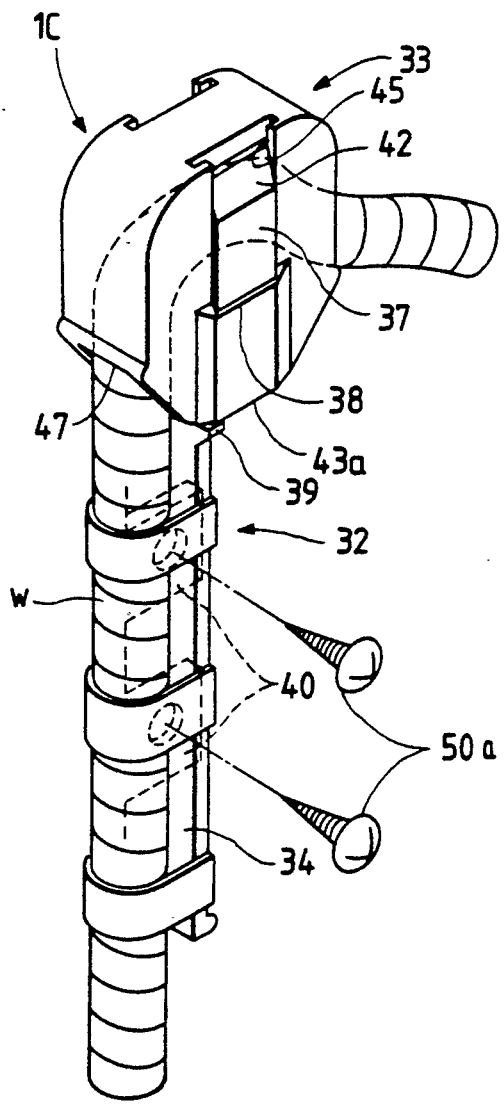

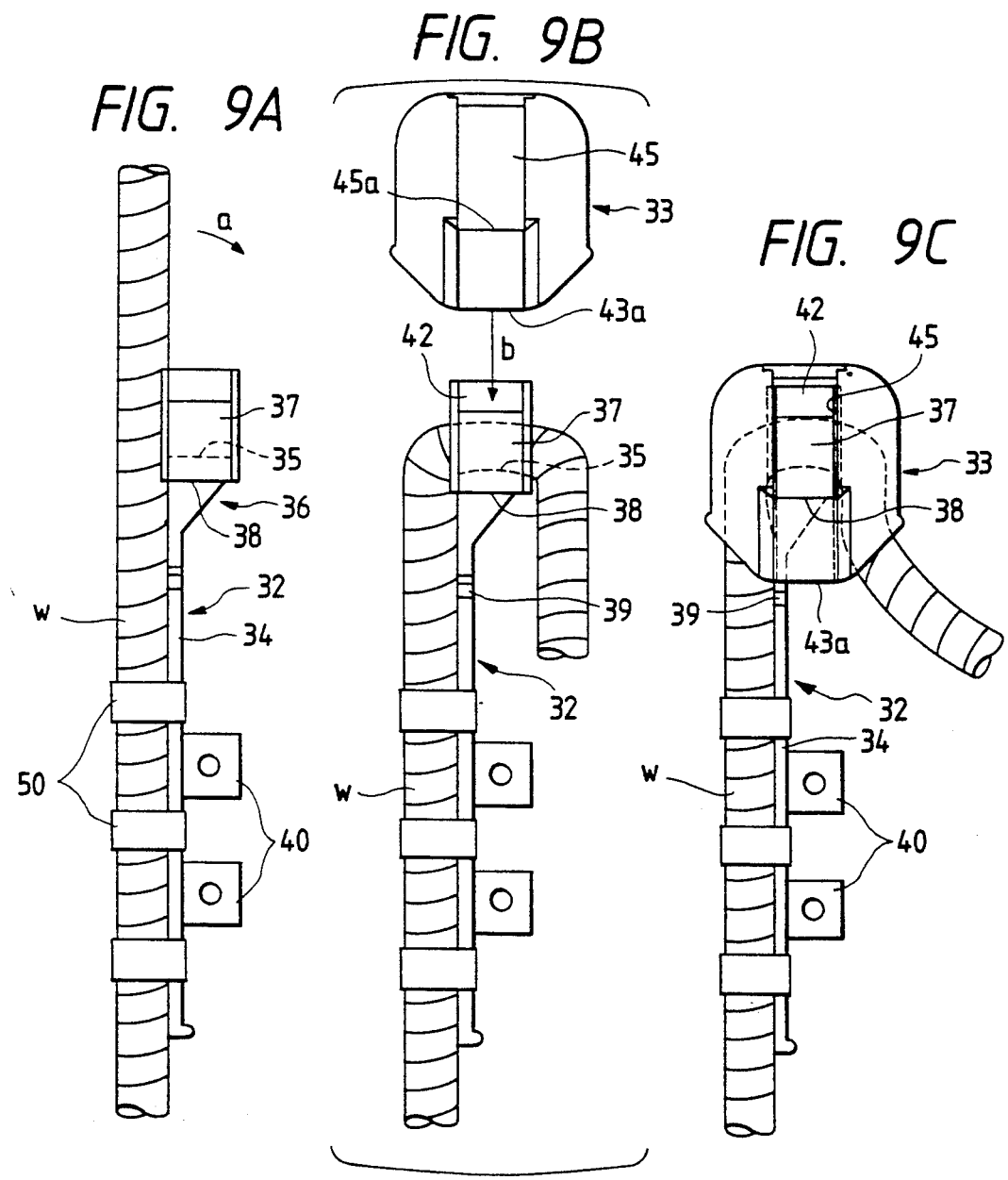

WIRE HARNESS PROTECTOR

BACKGROUND OF THE INVENTION

This invention relates to a wire harness protector mounted on a bent or folded portion of a wire harness arranged on an opening-closing portion of a part (e.g. trunk lid) of an automobile, so as to improve the bending durability thereof.

FIG. 10 shows a conventional wire harness protector construction in which, in order for a wire harness w arranged on a trunk lid t of an automobile to have bending durability when the trunk lid is opened and closed, the wire harness w is bent into a U-shape in the vicinity of a trunk hinge h. This bent portion 28 is tied by an adhesive tape 29.

The wire harness w is fixed to a vehicle body p by a clip 14 in the vicinity of the bent portion 28, is extended from the bent portion 28 along a stay s of the trunk lid t, fixed to the inside of the trunk lid t by clamps 30 or the like, and connected to a back-up lamp 31 and others.

However, in this conventional wire harness protector construction, when the trunk lid is opened as indicated by phantom lines in FIG. 10, the wire harness w is lifted about the clip 14, so that the tip end of the bent portion 28 interferes with the vehicle body p. As a result, the tip end of the bent portion 28 may be damaged. Further, using adhesive tape 29 to tie the bent portion 28 is a cumbersome operation; also, because of a restoring force of the bent portion 28, this cannot be done so easily by a manual operation. The adhesive tape 29 also is liable to be released because of this restoring force.

SUMMARY OF THE INVENTION

With the above problems in view, it is an object of this invention to provide a wire harness protector construction which prevents damage to a bent portion of a wire harness, and which enables the bent portion to be tied in a simple and easy manner.

According to one aspect of the present invention, a wire harness protector includes a protective cap adapted to be fitted on a bent portion of a wire harness, and a wire harness holder member fitted inside the protective cap.

According to another aspect of the invention, a wire harness protector is characterized in that a wire harness retaining portion is provided inside a protective cap adapted to be fitted on a bent portion of a wire harness. A flexible fixing arm can be provided relative to the above protective cap.

According to a further aspect of the invention, a wire harness protector includes a fixing arm having, at its distal end, a head which has a wire harness guide groove and a first retaining portion, and a protective cap having a second retaining portion engageable with the first retaining portion.

Since the bent portion of the wire harness is protected by the protective cap, the bent portion will not interfere with the exterior, and hence is prevented from damage. To hold the bent portion in the protective cap, the wire harness holder member is merely fitted inside the protective cap, and therefore the operation is simple. Where the wire harness retaining portion is provided inside the protective cap, the wire harness can be retained merely by inserting the bent portion of the wire harness into the protective cap, and therefore the operation is easy. Where the flexible fixing arm is provided relative to the protective cap, vibration of the protective cap can be prevented without affecting the flexibility of the bent proximal portion of the wire harness. Further, where the wire harness guide groove is provided in the head of the fixing arm, the wire harness fixed to the fixing arm can be bent easily in the guide groove, and therefore the operation is easy.

BRIEF DESCRIPTION OF THE DRAWINGS

FIG. 7 is an exploded, perspective view of a fourth embodiment of the invention;

FIG. 8 is a perspective view showing an assembled condition of the fourth embodiment;

FIGS. 9A, 9B and 9C are views illustrative of the sequence of the assembling of the fourth embodiment.

DETAILED DESCRIPTION OF THE PREFERRED EMBODIMENTS

Figure 1:
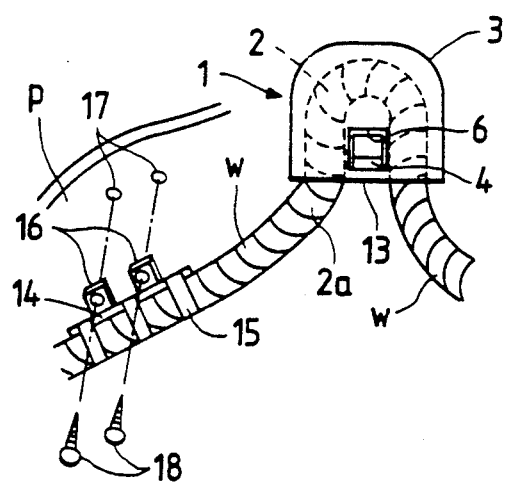
FIG. 1 is a front-elevational view of a first embodiment of the present invention.

FIG. 1 shows a first embodiment of a wire harness protector 1 of the present invention, including a protective cap 3 fitted on a bent portion 2 of a wire harness w, and a wire harness holder member 4 fitted inside the protective cap 3. Thus, the wire harness protector 1 is constructed so that the wire harness w can be held in a bent or folded condition inside the protective cap 3.

Figure 2A:
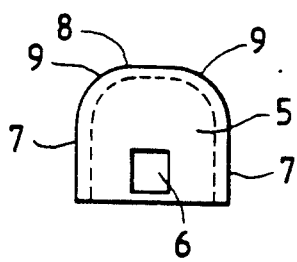
FIGS. 2A, 2B and 2C are front-elevational view of a protective cap of the present invention, a plan view thereof, and a cross-sectional view taken along the line 2C-2C of FIG. 2B, respectively.
Figure 2B:
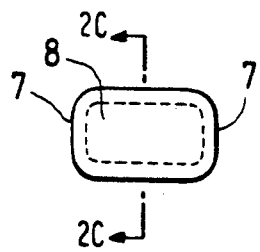
Figure 2C:
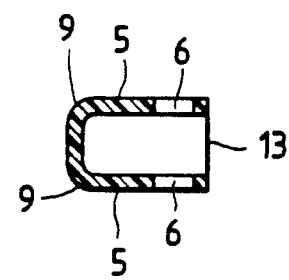

As shown in FIGS. 2A, 2B and 2C, the protective cap 3 is molded of a synthetic resin, and has a hollow rectangular body having one open end, the wall of the hollow body being thin. Retaining holes 6, 6 for retaining the holder member 4 are formed through front and rear walls 5, 5 of the protective cap 3, respectively. A corner portion into which each of side walls 7, 7 and a top wall 8 merge is curved, as at 9, so that the bent portion 2 of the wire harness w conforms to such a curved shape.

Figure 3A:
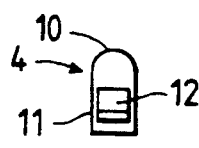
FIGS. 3A, 3B and 3C are a front-elevational view of a wire harness holder member of the present invention, a plan view thereof, and a side-elevational view thereof, respectively.
Figure 3B:
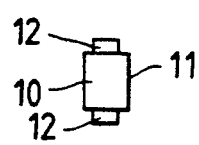
Figure 3C:
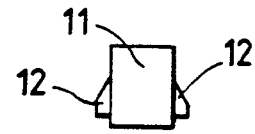

As shown in FIGS. 3A, 3B and 3C, the wire harness holder member 4 is also made of a synthetic resin, and has a main portion 11 of a generally square-pillar shape having a curved end 10. Retaining projections 12, 12, which are engaged in respective retaining holes 6, 6 in the protective cap 3, are formed respectively on the opposite sides of the main portion 11. The protective cap 3 and the wire harness holder member 4 can be molded integrally into a unitary construction through a strap or band (not shown).

As shown in FIG. 1, the bent portion 2 of the wire harness w is inserted into the protective cap 3 through an open portion 13 of this cap, and the holder member 4 is fitted in a space formed inside the bent portion 2. In this fashion, the curved end 10 of the holder member 4 urges the bent portion 2, and the retaining projections 12 are engaged respectively in the retaining holes 6 in the protective cap 3, thereby firmly holding the wire harness w. A conventional-type clip 14 is secured fixedly to the wire harness w by a tape 15 wound around the wire harness. Mounting pieces 16 are fastened to a vehicle body p by bolts 18 threaded into screw holes 17 in the vehicle body p.

Figure 4A:
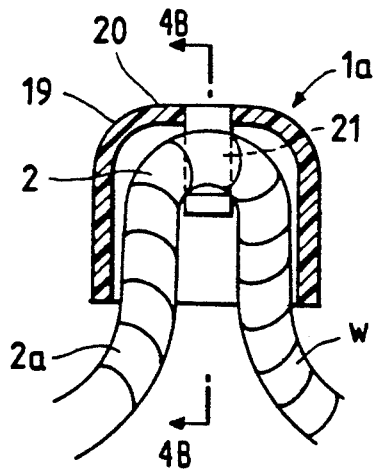
FIGS. 4A and 4B are a vertical cross-sectional view of a second embodiment of the invention, and a cross-sectional view taken along the line, 4B-4B of FIG. 4A, respectively.
Figure 4B:
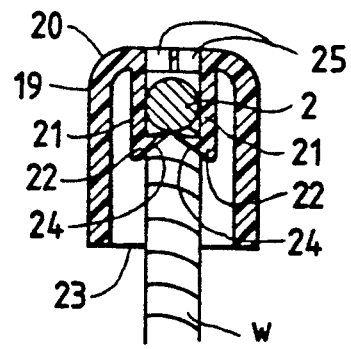

FIGS. 4A and 4B show a second embodiment of a wire harness protector 1a according to the present invention, in which a pair of parallel, flexible wire harness retaining pieces 21, 21 are provided in a protective cap 19 of a synthetic resin, and depend from a top wall 20 of the protective cap 19. The pair of wire harness retaining pieces 21, 21 have at their distal ends inwardly-directed hook-like retaining pawls 22, 22, respectively. The pair of retaining pawls 22, 22 have respective inclined surfaces 24, 24 directed toward an open portion 23 of the protective cap 19. Therefore, the bent portion 2 of the wire harness w can be inserted in between the pair of wire harness retaining pieces 21, 21, and can be held therebetween. Release holes 25 are provided for a mold in connection with the molding of the retaining pawls 22, 22.

Figure 5:
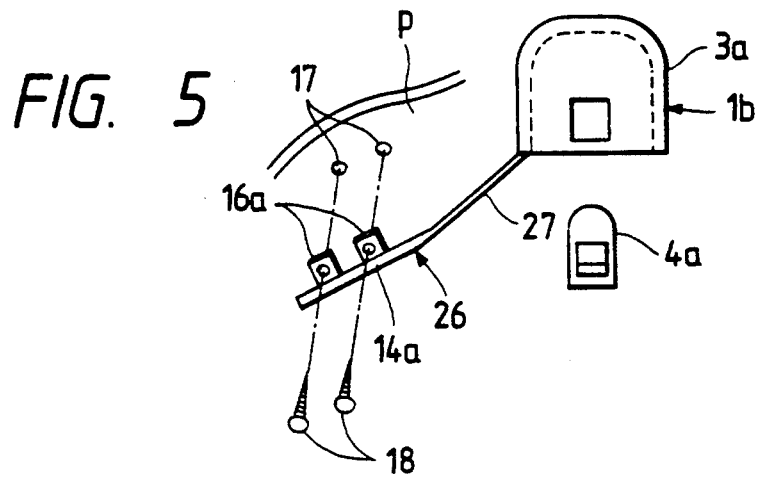
FIG. 5 is an exploded, front-elevational view of a third embodiment of the invention.
Figure 10:
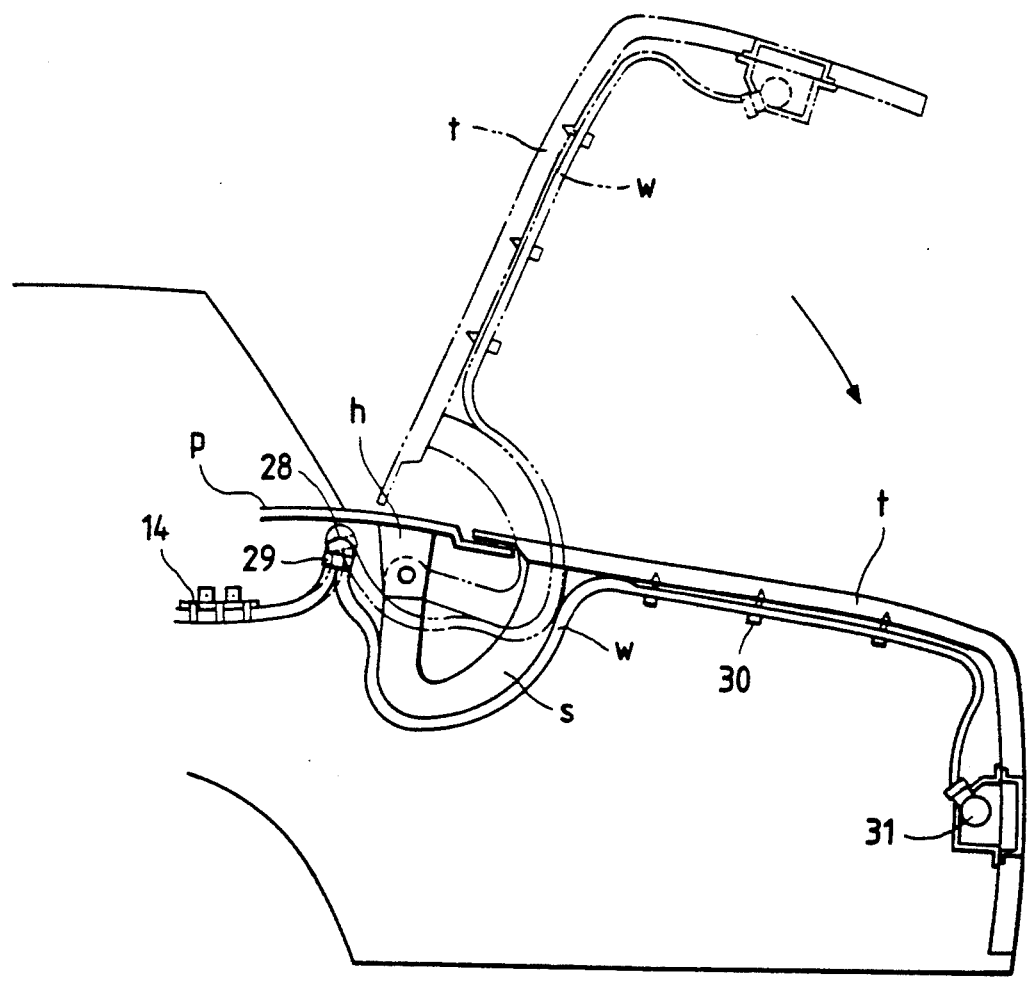
FIG. 10 is a front-elevational view of a conventional wire harness protector.

FIG. 5 shows a third embodiment of a wire harness protector 1b according to the present invention, in which a fixing arm 26 having a flexible band portion 27 is formed integrally with a protective cap 3a similar to that of the wire harness protector 1 of the first embodiment. The fixing arm 26 has a base portion 14a have mounting pieces 16a similar to that of the known clip 14 (see FIG. 10) for fixing the wire harness w and the base portion 14a is formed integrally with the flexible band 27.

The bent portion 2 of the wire harness w is inserted into the protective cap 3a, a wire harness holder member 4a is fitted, and bolts 18 are passed respectively through bolt holes of the mounting pieces 16a and are threaded respectively into screw holes 17 in the vehicle body p. Instead of using these bolts, retaining projections (not shown) may be formed on the base portion 14a, in which case these retaining projections are fitted respectively in retaining holes (not shown) formed in the vehicle body p. This third embodiment can be applied to the wire harness protector 1a shown in FIG. 4.

Figure 6A:
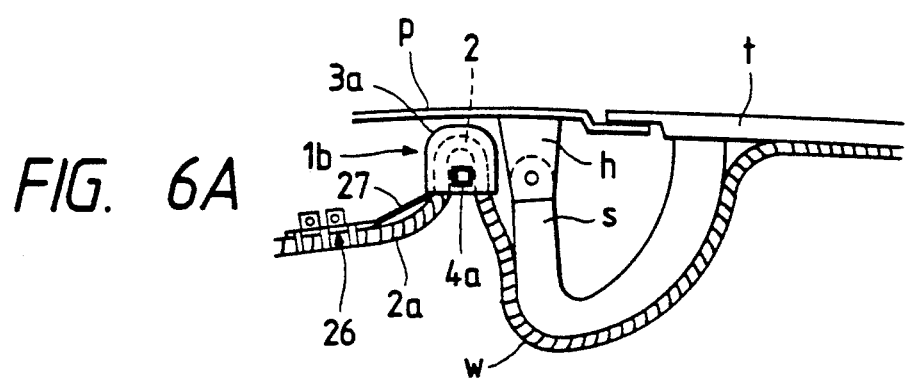
FIGS. 6A and 6B are views illustrative of the operation of the third embodiment.
Figure 6B:
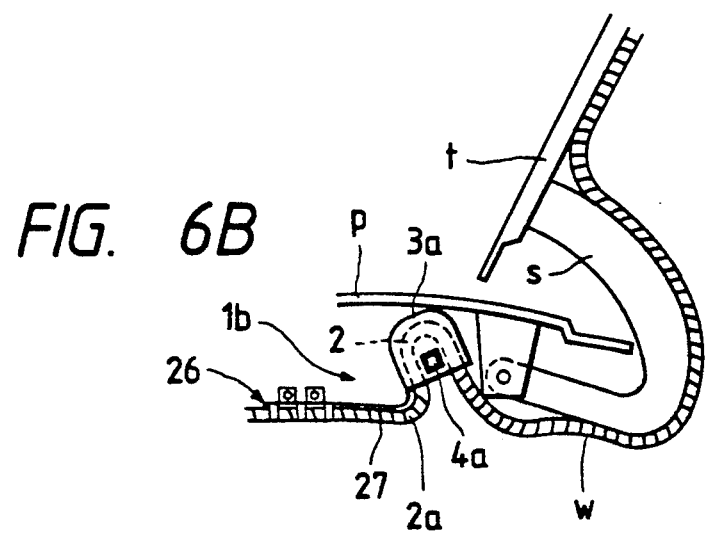

FIG. 6A shows the mounted condition of the wire harness protector 1b when a trunk lid is closed, and FIG. 6B shows the mounted condition when the trunk lid is open. The letter t denotes the trunk lid, s is a stay, h a hinge, and p a vehicle body. When the trunk lid is closed (FIG. 6A), the flexible band 27 of the wire harness protector 1b is extended along the wire harness w, and supports the protective cap 3a holding the bent portion 2 of the wire harness w. When the trunk lid is open (FIG. 6B), the wire harness w is pulled and lifted, and at the same time the flexible band 27 of the wire harness protector 1b is bent to absorb that pulling force. Therefore, the bent proximal portion 2a of the wire harness w can move freely in response to the opening and closing of the trunk lid t. As a result, no undue force will be exerted on the bent proximal portion 2a of the wire harness w, as in the first and second embodiments shown in FIGS. 1 and 4. Further, the flexible band 27 restrains vibrations of the protective cap 3a produced during the running of the vehicle so that the interference of the protective cap 3a can also be prevented.

FIG. 7 shows a fourth embodiment of a wire harness protector 1c according to the present invention, including a wire harness-fixing member 32 of a synthetic resin, and a protective cap 33. The wire harness-fixing member 32 in turn includes a band-like fixing arm 34 having at its distal end a head 36 which has a central wire harness guide groove 35 having a generally U-shaped cross-section. Retaining step portions 38, 38 are formed respectively on outer side walls 37, 37 disposed respectively on the opposite sides of the guide groove 35. Stop projections 39, 39 are formed on opposite respective side edges of the fixing arm 34, and are disposed close to the head 36. Mounting pieces 40 are formed on the side edge of the fixing arm 34, and a tape retaining projection 41 is formed on the proximal end of the fixing arm 34. The bottom of the guide groove 35 is curved into a horseback-shape in a direction of passing of the wire harness, and the opposite side walls 37 of the guide groove 35 are flexible inwardly. The opposite side walls 37 have tapered sliding surfaces 42, 42, respectively.

The protective cap 33 has at one end an opening 43, and engaging windows 45, 45 for respectively engaging the opposite side walls 37 (retaining step portions 38) are formed respectively through front and rear walls 44, 44 of the protective cap 33. Notches 47, 47 for passing the wire harness therethrough are formed respectively in opposite side walls of the protective cap 33. Connecting portions 49, 49 interconnecting the opposite side walls 46 and a top wall 48 are curved smoothly, and the interior of the protective cap 33 serves as a wire harness-passing space.

FIG. 8 shows a mounted condition of the wire harness protector 1c. To effect this mounting, as shown in FIGS. 9A to 9C, the wire harness w first is fixed to the fixing arm 34 of the wire harness fixing member 32 by tapes 50 wound therearound, and a forward portion of the wire harness w is bent or folded in a direction of arrow a, and is passed through the guide groove 35. By doing so, the wire harness w can be bent easily without hurting the hands. Then, the protective cap 33 is fitted in a direction of arrow b.

At this time, the tapered surfaces 42 of the opposite side walls 37 of the guide groove 35 slidingly engage an open end edge 43a of the protective cap 33, and the opposite side walls 37 are flexed inwardly, so that the protective cap 33 can be fitted easily. The opposite side walls 37 then are restored, so that the retaining step portions 38 can be retained positively in respective frame portions 45a of the engaging windows 45. Here, the open end edge 43a is abutted against the stop projections 39, and hence is stopped. Finally, the mounting pieces 40 are fastened to a vehicle panel (not shown) by screws 50a (FIG. 8), thus completing the mounting operation.

In this fourth embodiment, a flexible band such as the flexible band 27 of the third embodiment (FIG. 5) may be formed integrally with the fixing arm 34.

As described above, according to the present invention, since the bent portion of the wire harness is protected by the protective cap, the bent portion is prevented from damage by interference with the exterior. Further, the conventional tying of the bent portion by an adhesive tape is not necessary, and the operation can be done in a simple and easy manner. As a result, operability is improved, and the burden on the operator is reduced. Further, by providing the flexible fixing arm on the protective cap, the vibration of the protective cap during the running of the vehicle, as well as the interference of the protective cap, can be prevented without affecting the flexibility of the bent proximal portion of the wire harness. Therefore, durability is enhanced further. Furthermore, the wire harness guide groove is formed in the head of the fixing arm, and the cap is adapted to be fitted on the head. With this construction, the bending of the wire harness can be done easily.

While the invention has been described in detail above with reference to preferred embodiments, various modifications within the scope and spirit of the invention will be apparent to people of working skill in this technological field. Thus, the invention should be considered as limited only by the scope of the appended claims.

What is claimed is:

1. A wire harness protector mounted on a bent portion of a wire harness for electrical wires arranged on an opening-closing portion of a part of a vehicle, said wire harness protector comprising:
   a protective cap, adapted to be fitted on said bent portion of said wire harness, for holding said wire harness in a bent fashion; and
   a wire harness holder member fitted inside said protective cap, to attendantly improve a bending durability of said wire harness when said part of said vehicle is opened and closed.

2. A wire harness protector mounted on a bent portion of a wire harness for electrical wires arranged on an opening-closing portion of a part of a vehicle, said wire harness protector comprising:
   a protective cap, adapted to be fitted on said bent portion of said wire harness, for holding said wire harness in a bent fashion; and
   a wire harness retaining portion provided inside said protective cap, to attendantly improve a bending durability of said wire harness when said part of said vehicle is opened and closed.

3. A wire harness protector according to claim 1, further comprising a flexible fixing arm, connected to said protective cap, for attaching an unbent portion of said wire harness to a body portion of said vehicle.

4. A wire harness protector according to claim 2, further comprising a flexible fixing arm, connected to said protective cap, for attaching an unbent portion of said wire harness to a body portion of said vehicle.

5. A wire harness protector mounted on a bent portion of a wire harness for electrical wires arranged on an opening-closing portion of a part of a vehicle, said wire harness protector comprising:
   a fixing arm having, at a distal end thereof, a head having a wire harness guide groove and a first retaining portion; and
   a protective cap having a second retaining portion, engageable with said first retaining portion, for holding said wire harness in a bent fashion, to attendantly improve a bending durability of said wire harness when said part of said vehicle is opened and closed.

* * * * *